May 26, 1925.
W. L. FLEISHER
BUILT-IN DUCT FOR BAKERIES' PROOF BOXES
Filed Nov. 20, 1924
1,539,555
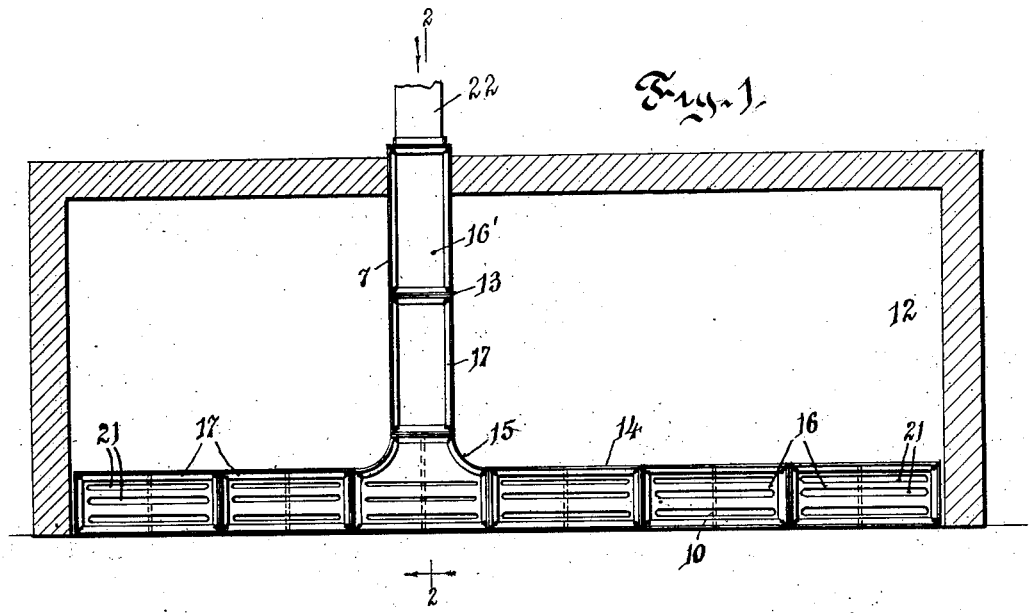
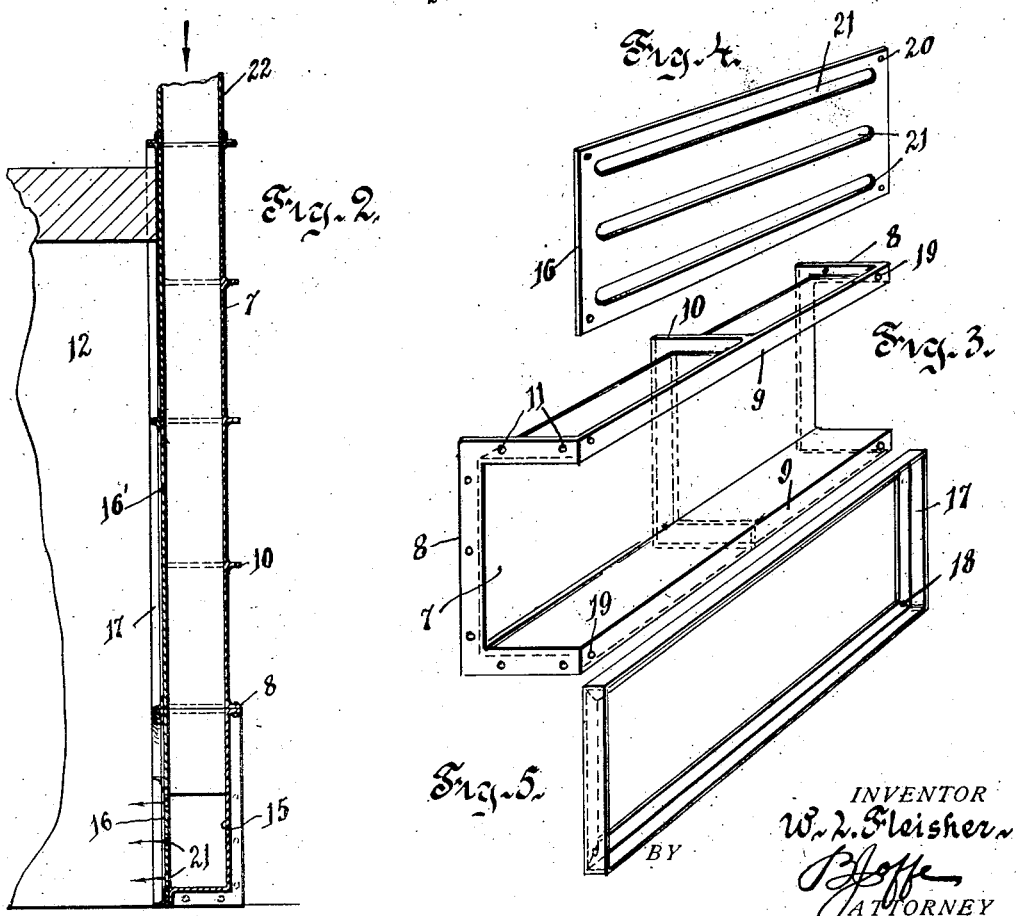
INVENTOR
W. L. Fleisher
BY
ATTORNEY Patented May 26, 1925.

1,539,555

UNITED STATES PATENT OFFICE.

WALTER L. FLEISHER, OF NEW YORK, N. Y.

BUILT-IN DUCT FOR BAKERIES' PROOF BOXES.

Application filed November 20, 1924. Serial No. 751,102.

*To all whom it may concern:*

Be it known that I, WALTER L. FLEISHER, a citizen of the United States, and a resident of the county of New York, city of New York, and State of New York, have invented new and useful Built-In Ducts for Bakeries' Proof Boxes, of which the following is a specification.

My invention relates to an improvement in air ducts for bakeries' proof boxes and the objects of my improvement are first, to provide an air duct of the class described, which can be built in the wall of the proof boxes while the box is being built, without considering the air conditioning; second, to provide means for distributing air at substantially constant volumes along the duct with the proper amount of pressure; third, to afford facilities for maintaining the ducts and air passages within the box in sanitary conditions; fourth, to provide the ducts in sections or units to adapt it for all sizes of proof boxes; and fifth, to design the duct so as to fit the sheet metal covers which may have to be installed in the proof boxes.

I attain these objects by the structure illustrated in the accompanying drawing, in which—

Figure 1 is a longitudinal vertical section of a bakery's proof box, provided with my improved air duct;

Figure 2 is an enlarged section on line 2—2, Figure 1;

Figure 3 is a perspective view of a section or unit of the duct with the air distributing cover plate and the securing frame therefor removed;

Figure 4 shows a perspective view of the air distributing cover plate; and

Figure 5 is a perspective view of the air distributing cover plate securing frame.

Practically all proof boxes are made in standard sizes to accommodate standard size racks, and for proper proofing thereof, a definite amount of conditioned air is required. As far as I know, up to the present, no proof boxes conditioned with saturated or partly saturated air have ever been built with other than sheet metal ducts and each sheet metal installation had to be of separate design, holes cut into the boxes after they are built to fit the sheet metal duct work. It necessarily entails an unnecessary expense. In addition, the sheet metal ducts, by their construction, are inaccessible and very hard to maintain sanitary. Sheet metal air ducts are built so that their cross section is varying to obtain the proper supply and pressure of conditioned air within the box. This peculiarity of the sheet metal box does not permit standardization, due to the fact that proof boxes necessarily vary in sizes.

To obviate the above defects, I make my air duct of uniform cross section and provide the same with removable air distributing cover plates which are arranged to deliver into the proof box a definite amount of conditioned air at a proper pressure. To adapt my air duct for proof boxes of different capacities, I make the duct in sections or units or multiples thereof, which can be bolted together to obtain the desired length of duct.

As shown in Figure 3 particularly, the unit or section 7 is preferably in the shape of a U channel, provided with flanges 8 at its extremities and flanges 9 along its edges. The sections are made preferably of cast iron, reinforced by a rib 10 and of a thickness sufficient to support a brick wall of a proof box. The flanges 8 are provided with apertures 11 so that the adjacent units or sections can be bolted together to obtain the desired length of the duct within a proof box 12.

When the size of a proof box has been decided upon, the proper number of sections are placed at the bottom of the proof box, and bolted together. The ends of the extreme horizontal sections can be covered by suitable plates or the wall built upon the bolted sections may be made to wall in the extreme end sections. The vertical branch 13 of the duct is also made of units 7 and to reduce the resistance of flow from the vertical branch 13 to the horizontal branch 14 of the duct, the T shaped unit 15 is provided with rounded corners.

The built-in duct within the proof box has its channel opening into the box and the depth of the channelled units is preferably substantially that of the thickness of the wall used in building proof boxes for bakeries.

The channelled units forming the duct are closed by plates 16 and 16' preferably made of aluminum and which are retained against the flanges 9 of the sections by frames 17 made of angle shapes and provided with suitable apertures 18 which match with the apertures 19 in the flanges 9 and the apertures as in the plate 16. Through these apertures, suitable means are introduced to lock the frame and plate to the corresponding duct section.

The cover plate 16' in the vertical section 13 of the duct has no apertures, but the cover plates 16 in the horizontal or distributing part 14 of the duct have openings 21. These openings 21 vary in size in the different cover plates 16, the openings increasing in size in the cover plates as they are attached to units or section 7 which are further away from the vertical branch 13 of the duct. In consequence, I am able to supply a definite volume of conditioned air through the duct at a definite pressure, although the duct itself is of uniform cross section.

By providing channelled units of uniform cross section, it becomes possible to build the proof box of any size desired by simply laying the desired number of channelled units 7 without inquiring into the air conditioning problem.

By providing removable cover plates 16 and 16', it is possible to maintain the ducts in sanitary condition, as the removal of the plates gives easy access to the duct and the plates themselves can be maintained clean once removed from the duct by washing in a suitable cleaning solution. This feature is of very great importance in bakery air conditioning work.

As shown in Figure 1, the air is introduced through a suitable sheet metal duct 22, which engages the vertical branch of the duct made of the channelled units 7 and from where the air is delivered to the horizontal part 14 of the duct, wherefrom the conditioned air is delivered through the openings 21 in the cover plates directly into the proof box.

While I show the channelled units of U shaped cross section, the structure is by no way limited to that particular shape, as any desired shape can be used, provided it is of uniform cross section and proper removable cover plates are provided therefor.

I claim—

1. In combination with a proof box for bakeries of a sectional air duct having removable air distributing cover plates presenting apertures of different sizes for delivering air at substantially constant volumes along the duct.

2. In combination with a proof box for bakeries of a built-in air duct of uniform cross section, having removable air distributing cover plates, said cover plates presenting openings for the delivery of conditioned air at substantially constant volumes along the duct, substantially as and for the purpose specified.

3. In combination with a proof box for bakeries of a built-in air duct formed of channelled sections of uniform cross section, having removable air distributing cover plates for said sections.

4. In a built-in duct for proof boxes, a plurality of interconnected channelled sections of uniform cross section, air distributing cover plates, associated with said sections, and frames for detachably securing said air distributing cover plates to the channelled sections.

5. In a built-in duct for proof boxes, a plurality of interconnected U shaped channelled sections, each of said sections being flanged at its longitudinal edges, plates for covering said channelled sections, adapted to engage said flanges, said plates presenting openings for delivering air from the said channelled sections, and frames for detachably securing said plates to the flanges of said sections.

WALTER L. FLEISHER.